J. C. PRIMS.
LEATHER SKIVING MACHINE.
APPLICATION FILED MAR. 31, 1914.
1,127,512.
Patented Feb. 9, 1915.
2 SHEETS—SHEET 1.
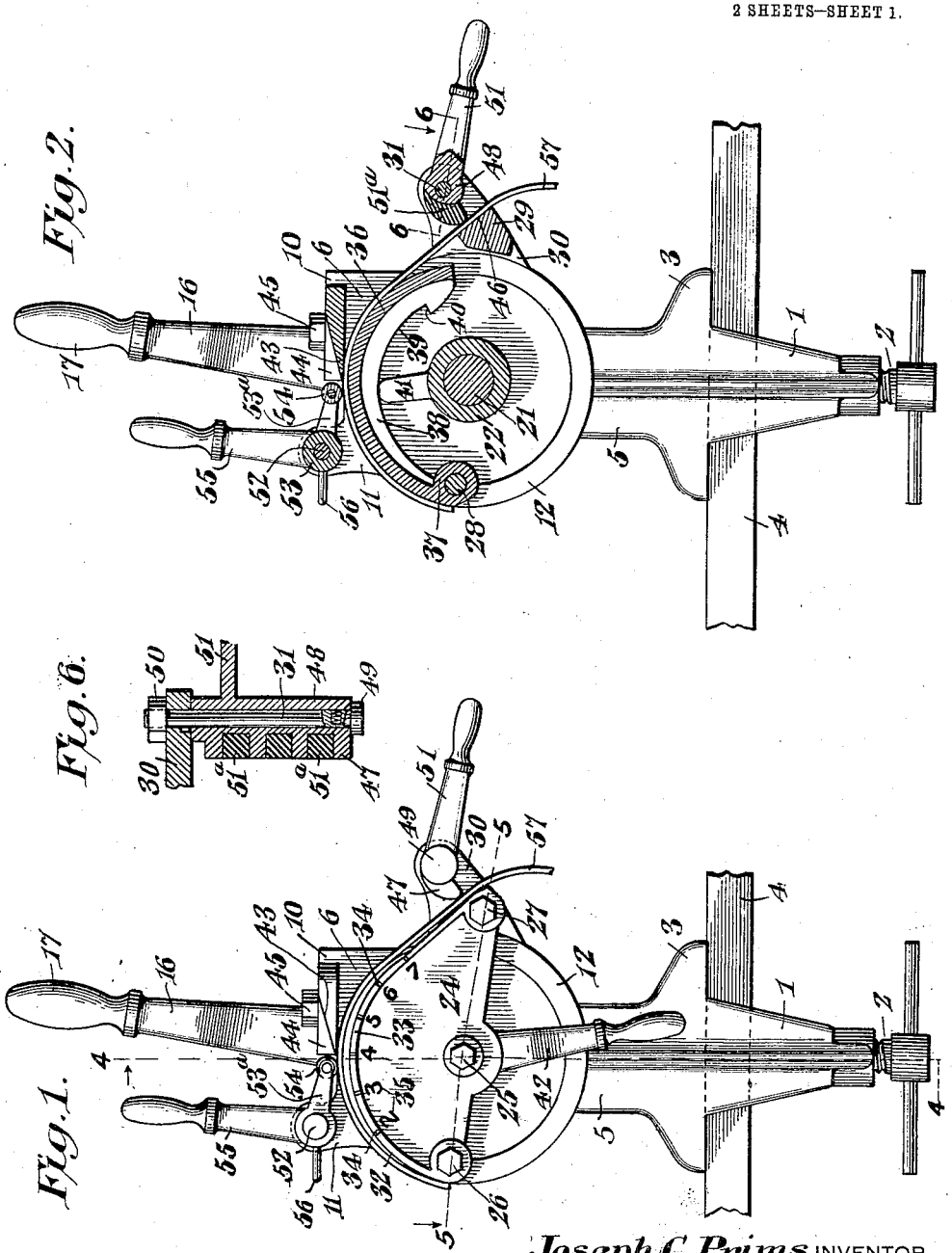
Joseph C. Prims, INVENTOR

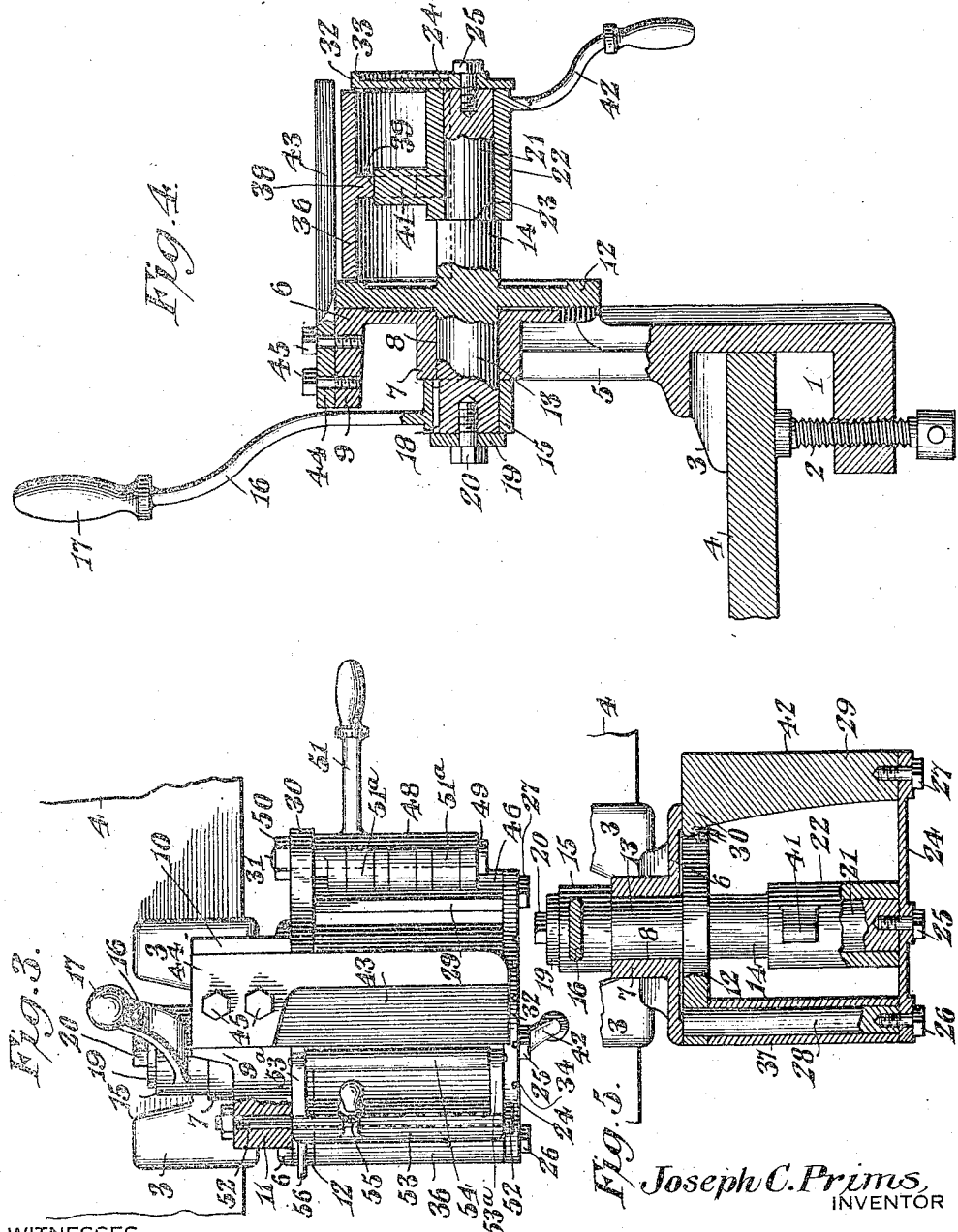

UNITED STATES PATENT OFFICE.

JOSEPH C. PRIMS, OF HORNELL, NEW YORK, ASSIGNOR TO SWIFT MACHINERY MANUFACTURING COMPANY, OF HORNELL, NEW YORK, A CORPORATION OF NEW YORK.

LEATHER-SKIVING MACHINE.

1,127,512.  Specification of Letters Patent.  Patented Feb. 9, 1915.

Application filed March 31, 1914.  Serial No. 828,640.

*To all whom it may concern:*

Be it known that I, JOSEPH C. PRIMS, a citizen of the United States, residing at Hornell, in the county of Steuben and State of New York, have invented a new and useful Leather-Skiving Machine, of which the following is a specification.

This invention has reference to improvements in leather skiving machines, and is designed more particularly for beveling the ends of strips of belting in order to join them.

The machine of the present invention permits the formation of splices of different lengths, so that the junction of the belting may be made as strong as desired and without waste.

The machine of the present invention comprises a holding member with a movable part mounted to turn about an axis with a belt carrying portion movable into different degrees of eccentricity to the axis of movement of the belt, the leather being moved into proper relation to a knife or cutter so arranged as to cut through the thickness of the belt at a rate with relation to the longitudinal movement of the belt to produce a long bevel cut varying in length in accordance with the eccentricity of the carrier, the whole arrangement being constructed for ease of manipulation and certainty of gripping the belt so that when the machine is set to make a skiving cut of a certain length there will be no variation in the cut due to slippage of the belt.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a front elevation with the parts in operative position to produce a cut of a determined length. Fig. 2 is a vertical section back of the face plate. Fig. 3 is a plan view of the machine in the position shown in Fig. 1. Fig. 4 is a section on the line 4—4 of Fig. 1, some parts being shown in elevation. Fig. 5 is a section on the line 5—5 of Fig. 1 with some parts in elevation. Fig. 6 is a section on the line 6—6 of Fig. 2.

Referring to the drawings, there is shown a clamp 1 carrying a clamp screw 2 and provided with supporting feet 3, whereby the clamp may be made fast to a supporting member represented at 4, and which may be indicative of a bench or table or other support. The clamp member is formed with a post or standard 5 which in operative position is customarily upright, and is formed into a face plate 6 having a central boss 7 on what constitutes its rear face, and through this boss and face plate there is formed a passage 8 concentric therewith. On top of the face plate and to one side of its upright diameter, there is formed a shelf or table 9 with an upstanding rib 10 along the edge remote from the upright diameter of the face plate. On the other side of the upright diameter the top of the standard is formed with a lug 11 centrally bored for a purpose which will presently appear. There is also provided another disk-like plate 12 having oppositely directed axial extensions 13, 14, respectively, the extension 13 fitting the passage 8 and both being cylindrical so that the extension 13 constitutes a spindle upon which the plate 12 may turn. This spindle is of a length to extend beyond the end of the boss 7 remote from the face plate 6 and there receives a sleeve 15 formed on one end of a lever 16 terminating at the other end in a handle 17, the sleeve 15 being held to the spindle 13 by a key 18, so that movements of the lever 16 are participated in by the spindle 13 and disk 12. The handle is held to the spindle by a washer 19 and screw 20 in the particular construction shown, but it will be understood that these parts may be otherwise formed, if desired, so long as they perform their designed functions.

The axial extension 14 is longer than the extension 13, and has a reduced outer end 21 upon which is mounted a sleeve 22 abutting at one end against a shoulder 23 formed by the reduced extremity 21, and this sleeve is held on the portion 21 by a plate 24 and screw 25. The plate 24 constitutes the front plate of the machine, and is supported on opposite sides of the axial extension 14 constituting a spindle by screws 26, 27, respectively, the screw 26 being tapped into the outer end of a rod 28 carried by the disk 12 near one margin, and the screw 27 being tapped into a lug 29 formed on and extending from a bracket 30 which may be in one piece with the disk 12 in offset relation to the periphery thereof, and which bracket furthermore carries a rod or pin 31 which together with the lug 29 extend toward the front of the machine in substantially parallel relation to the spindle 14 and rod 28, the spindle 14, rod 28 and lug 29 being all of substantially the same degree of projection from the disk 12.

The front plate 24 has a peripheral portion 32 eccentric to the axis of the disk 12 and is formed with an outstanding rib 33 which for convenience of adjustment of certain parts has spaced notches 34 formed therein and adjacent to these notches are certain indicia such as numerals 35, which latter and the notches, as will presently appear, aid an operator in positioning certain parts during the operation of the machine.

Mounted at one end of the rod 28 between the disk 12 and the front plate 24 is a substantially semi-cylindrical bed plate 36 having the end mounted on the rod 28 enlarged, as shown at 37, to provide for a bore or passage receiving the rod 28, and this plate is of an axial length to fit snugly yet freely between the marginal portion of the disk 12 and the front plate 24. The bed plate 36 may include more than a semi-cylinder or may be of less extent so long as it performs the functions for which it is designed. On the inner face and about midway of the axial length of the bed plate 36 there is provided a circumferentially extended rib 38 having an inner edge 39 made eccentric to the axis of generation of the bed plate, the radial thickness of the rib 38 increasing from the enlargement 37 toward the opposite edge of the bed plate, and this rib there terminates in a shoulder 40.

Formed on the sleeve 22 is a radial finger 41 shaped at its outer end to engage the inner peripheral portion of the rib 38 so that when the sleeve 22 is rocked upon the spindle 14 the finger 41 is moved along the rib 38 and because of the eccentricity of the latter, will rock the bed plate 36 on its supporting rod 28, thereby causing the bed plate to assume different positions of eccentricity with relation to the axis of the disk 12, and since this bed plate is carried by the disk it will in turn move with the disk when the latter is rocked by means of the lever 16. The sleeve 22 is provided with a manipulating handle 42, which in the particular arrangement shown in the drawings depends from the sleeve 22 close to the front plate 24 and may readily be set in different positions with respect to the numerals 35. By making the sleeve 22 to fit rather snugly between the shoulder 23 and the front plate 24, it will hold its different positions of adjustment frictionally.

The shelf or table 9 serves as a support for a knife or blade 43 closely overriding the disk 12 with the cutting edge of the knife in operative relation to the bed plate 36, the knife having a shank portion 44 held to the table 9 by screws 45, and the table may be finished true to support the knife in sufficiently true relation to the axis of rocking of the bed plate 36 to serve the purposes of the present invention.

The lug 29 is shaped on one face 46 to serve as a fixed clamp member to which is opposed an eccentric clamp member 47 having a body portion 48 longitudinally bored and traversed by the pin 31 constituting a pivot support for the clamp member 47, the pin 31 having a permanent head 49 at one end and a lock nut 50 at the other end, the pin extending through the bracket 30 and held firmly thereto by the lock nut 50. The clamp member 47 is provided with a manipulating handle 51 extending therefrom, and in order to increase the hold of the clamp member, blocks 51$^a$ of some softer metal than iron or steel are inset into the body member 48 at suitable intervals.

The lug 11 carries a pivot pin 52 extending over the disk 12 and bed plate 36 in substantially parallel relation to the pin 28 and mounted on this pin is a rocker structure 53 having terminal arms 53$^a$ in radial relation to the axis of rocking and located near the ends of the rocker member 53 and mounted in the outer ends of these arms is a roller 54 immediately in front of the cutting edge of the knife 43 and having a normal tendency, when in operative position, toward the bed plate 36. This rocker member is manipulated by a handle 55 and in order to prevent it from moving beyond a certain distance in one direction, it carries a pin 56 in position to engage the periphery of the disk 12.

If it be desired to make a bevel cut in a piece of belting, indicated at 57, in Figs. 1 and 2, the belt is laid upon the bed plate 36 with the end where the cut is to terminate reaching close to the pivot 28 of the bed plate, and the belt is also carried between the lug 29 and the clamp portion of the clamp member 47, whereupon the belt is firmly secured by the clamp members 29 and 47. The bed plate 36 is adjusted to the desired degree of eccentricity with the axis of rocking of the disk 12 by a suitable movement of the sleeve 22 and finger 41, this movement being determined by the position of the handle 42 with reference to the numbers 35. In the particular showing of the drawing this is about midway between the numbers three and four, indicating that the beveled or skiving cut will be about three and one-half inches long, the arrangement being such that the edge of the knife 43 will enter the belt 57 at approximately midway between the numbers three and four. The roller 54 serves to hold the belt to the bed plate immediately in front of the cutting edge of the knife without at all rubbing the belt, but readily rolling therealong, the overhanging weight of the roller 54 and handle 55 being sufficient for the purpose. Now, by grasping the handle 17 and moving the lever 16 toward the right as viewed in Figs. 1 and 2, the bed plate 36 slowly approaches the cutting edge of the knife as the end 37 of the bed plate 36 moves toward the cutting edge of the knife, and consequently the belt on the bed plate is correspondingly raised as it approaches the knife, wherefore the latter moves through the belt until it reaches the inner face of the belt adjacent to the rod or pin 28. If a longer cut be desired, the bed plate 36 is adjusted correspondingly, and the knife 43 will enter the belt at a greater distance from the pivot rod 28, but the termination of the cut will be as before adjacent to the rod 28, so that the bevel cut is longer considering the belt as the same thickness as before.

What is claimed is:—

1. In a leather skiving machine, a supporting member movable about an axis, a bed plate pivotally mounted at one end on said member to one side of the axis of movement thereof, a fixed cutter in operative relation to the bed plate, and an adjusting member for the bed plate movable about the axis of movement of the supporting member, the bed plate being provided with a part in eccentric relation to the axis of movement of the supporting member and located in coactive relation to the adjusting member for adjustment of the bed plate in different positions of eccentricity with relation to the supporting member.

2. In a leather skiving machine, a supporting member movable about an axis, a bed plate pivotally mounted at one end on said member to one side of the axis of movement thereof, a fixed cutter in operative relation to the bed plate, and an adjusting member for the bed plate movable about the axis of movement of the supporting member, the bed plate being provided with a part in eccentric relation to the axis of movement of the supporting member and located in coactive relation to the adjusting member for adjustment of the bed plate in different positions of eccentricity with relation to the supporting member, said supporting member being provided with clamping means for the leather to be treated, and with a manipulating handle separate from and independent of the clamping means for causing movement of the supporting member with reference to the cutter.

3. In a leather skiving machine, a rockable supporting member, a bed plate eccentrically mounted thereon, a front plate carried by the supporting member and confining the bed plate thereto, and means for moving the bed plate into different positions of eccentricity with relation to the axis of the supporting member, said means and the front plate having coacting portions for indicating predetermined degrees of eccentricity of the bed plate.

4. In a leather skiving machine, a body member, a cutter mounted thereon, a rockable member carried by the body member and provided with a manipulating handle, said rockable member having an offstanding clamping device for the leather to be treated, a bed plate pivoted at one end to the rockable member in eccentric relation thereto and terminating at the other end adjacent to the clamping device, a front plate on the rockable member for holding the bed plate thereto, and an adjusting means for the bed plate also carried by the rockable member and movable with reference to the bed plate to adjust it into different positions of eccentricity to the movements of the rockable member, the adjusting means and the front plate having co-acting portions for indicating the positions of eccentricity of the bed plate to produce different lengths of cut.

5. In a leather skiving machine, a body member, a cutter mounted thereon, a rockable member carried by the body member and provided with a manipulating handle, said rockable member having an offstanding clamping device for the leather to be treated, a bed plate pivoted at one end to the rockable member in eccentric relation thereto and terminating at the other end adjacent to the clamping device, a front plate on the rockable member for holding the bed plate thereto, and an adjusting means for the bed plate also carried by the rockable member and movable with reference to the bed plate to adjust it into different positions of eccentricity to the movements of the rockable member, the adjusting means and the front plate having coacting portions for indicating the positions of eccentricity of the bed plate to produce different lengths of cut, the machine being also provided with a gravity pressure device adjacent to the cutter and in operative relation to the bed plate.

6. A machine for skiving leather comprising a body member, a cutter fixed thereon, a gravity pressure roller mounted on the body member and having a normal tendency to operative position, a rockable member having axially arranged spindles on opposite sides with one spindle mounted in the body member, a manipulating handle carried by said spindle, a bed plate mounted eccentrically on the rockable member, a manipulating device for the bed plate mounted on the other spindle of the rockable member, and said manipulating device and bed plate having coacting members for varying the eccentricity of the bed plate, and a clamp carried by the rockable member and having means for its manipulation separate from and independent of the means for imparting rocking movements to the rockable member.

7. In a leather skiving device, a rockable member provided with clamping means for the leather to be treated, a knife in fixed position with reference to the rockable member, a bed plate eccentrically mounted on the rockable member, said bed plate having an eccentric rib thereon, and adjusting means for the bed plate having a finger movable concentrically with the rocking member and into engagement with the eccentric flange of the bed plate.

8. In a device for skiving leather, a rockable member, a partly cylindrical bed plate mounted eccentrically on the rocking member, said bed plate having an inner eccentric rib, an adjusting member for the bed plate having a finger movable concentrically with relation to the rockable member and into engagement with the eccentric rib on the bed plate, a cutter in operative relation to and fixed with reference to the rockable member and bed plate, a clamp carried by the rockable member for holding the leather to be treated, and gravity pressure means in operative relation to the bed plate and cutter for holding the leather to be treated adjacent to the cutting edge of the cutter.

9. A machine for skiving leather comprising a main structure, a disk having oppositely disposed axial spindles of which one is mounted in the main structure for the rocking of the disk thereon, said disk being provided with projecting members on opposite sides of the other spindle and with a peripherally located bracket, a front plate carried by the projecting members and by the second-named spindle, a partially cylindrical bed plate mounted upon one of the projecting members and movable thereon in eccentric relation to the axis of the disk, said bed plate having an eccentric rib on its inner face, a sleeve mounted for rocking on the second-named spindle and provided with a finger in operative relation to the rib on the bed plate, a clamp member mounted on the peripheral bracket of the disk in operative relation to the other one of the projecting members to clamp the leather to be treated thereto, said clamp member having its engaging portion provided with inset material of greater gripping effect than the main body of the clamp member, a knife mounted on the main body of the structure in operative relation to the bed plate, a pressure member mounted on the main structure in operative relation to the knife and bed plate, and a handle mounted on the first-named spindle for imparting rocking movements to the disk.

10. A machine for skiving leather comprising a main structure, a disk having oppositely disposed axial spindles of which one is mounted in the main structure for the rocking of the disk thereon, said disk being provided with projecting members on opposite sides of the other spindle and with a peripherally located bracket, a front plate carried by the projecting members and by the second-named spindle, a partially cylindrical bed plate mounted upon one of the projecting members and movable thereon in eccentric relation to the axis of the disk, said bed plate having an eccentric rib on its inner face, a sleeve mounted for rocking on the second-named spindle and provided with a finger in operative relation to the rib on the bed plate, a clamp member mounted on the peripheral bracket of the disk in operative relation to the other one of the projecting members to clamp the leather to be treated thereto, said clamp member having its engaging portion provided with inset material of greater gripping effect than the main body of the clamp member, a knife mounted on the main body of the structure in operative relation to the bed plate, a pressure member mounted on the main structure in operative relation to the knife and bed plate, and a handle mounted on the first-named spindle for imparting rocking movements to the disk, the sleeve carrying the finger having a manipulating handle and the front plate having indicia thereon coöperating with the handle to position the leather for predetermined lengths of cut through the leather to be treated.

11. In a leather skiving machine, means for producing an elongated bevel cut in the leather to be treated, and means for clamping the leather during the cutting operation comprising a member for receiving the leather, and a metal clamp member in operative relation to the leather receiving means and provided on its engaging face with blocks of softer metal than the remainder of the engaging face.

12. In a leather skiving machine, a supporting member, a bed plate pivotally mounted at one end on said member, a cutter in operative relation to the bed plate, the cutter and bed plate being movable one with relation to the other to produce a skiving cut in leather carried by the bed plate, and an adjustable member for the bed plate rockable about a supporting axis, and said bed plate being provided with a part in eccentric relation to the axis of movement of the adjustable member and engaged by the latter for adjustment of the bed plate into different positions of eccentricity with relation to the relative movements of the cutter and bed plate.

In testimony that I claim the foregoing as my own, I have hereto affixed my signature in the presence of two witnesses.

JOSEPH C. PRIMS.

Witnesses:
 JOHN BODENSTAB,
 E. J. SMITH.